United States Patent [19]

Hagenauer et al.

[11] Patent Number: 4,807,253

[45] Date of Patent: Feb. 21, 1989

[54] TIME-VARYING TRELLIS-CODED MODULATION FORMATS WHICH ARE ROBUST IN CHANNELS WITH PHASE VARIATIONS

[75] Inventors: Joachim Hagenauer, Seefeld, Fed. Rep. of Germany; Carl-Erik Sundberg, Chatham, N.J.

[73] Assignee: American Telephone and Telegraph Company, AT&T Bell Laboratories, Murray Hill, N.J.

[21] Appl. No.: 120,305

[22] Filed: Nov. 13, 1987

[51] Int. Cl.$^4$ .......................................... H04L 27/00
[52] U.S. Cl. ........................................ 375/57; 371/43
[58] Field of Search ...................... 375/37, 38, 53, 57, 375/58; 371/43, 44, 45

[56] References Cited

U.S. PATENT DOCUMENTS

| | | | |
|---|---|---|---|
| 4,077,021 | 2/1978 | Csajka et al. | 332/9 R |
| 4,208,739 | 6/1980 | Lu et al. | 375/2 |
| 4,447,908 | 5/1984 | Chevillat et al. | 375/42 |
| 4,462,101 | 7/1984 | Yasuda et al. | 371/43 |
| 4,483,012 | 11/1984 | Wei | 375/27 |
| 4,631,735 | 12/1986 | Quroshi | 375/34 |
| 4,641,327 | 2/1987 | Wei | 375/38 |
| 4,653,053 | 3/1987 | Pelchat et al. | 371/43 |

OTHER PUBLICATIONS

"Channel Coding with Multilevel/Phase Signals", *IEEE Trans. on Information Theory*, vol. IT-28, No. 1, Jan. 1982, pp. 55-67, G. Ungerboeck.
"Rotationally Invariant Convolutional Channel Coding with Expanded Signal Space—Part 1: 180°", *IEEE Journal on Selected Areas in Communications*, vol. SAC-2, No. 5, Sep. 1984, pp. 659-671, L. F. Wei.
"Rotationally Invariant Trellis Codes for mPSK Modulation", *ICC* 85, Chicago, Ill., Jun. 1985, pp. 18.1.1-18.1.5, M. Oerder.
"Modified Coded Octal Phase-Shift-Keying with Improved Carrier-Phase Tracking Ability", *IEEE Global Telecommunications Conf.*, GLOBECOM 86, Houston, Tex., Dec. 1986, Conf. Record, pp. 38.4.1-38.4.5, M. Bertelsmeier.
"Trellis Coded Modulations with Redundant Signal Sets", Part I and Part II, *IEEE Comm. Magazine*, vol. 25, No. 2, Feb. 1987, pp. 5-21, G. Ungerboeck, et al.
"Coded 8-PSK Experimental Modem for the Intelsat SCPC-System", *Proceedings ICDSC*, 7th Intl. Conf. on Digital Satellite Comm., Muenchen, May 1986, pp. 299-304, G. Ungerboeck.
"The Viterbi Algorithm", *Proceedings of the IEEE*, vol. 61, No. 3, Mar. 1973, pp. 268-278, G. D. Forney, Jr.

*Primary Examiner*—Robert L. Griffin
*Assistant Examiner*—Stephen Chin
*Attorney, Agent, or Firm*—Wilfred L. Wisner

[57] ABSTRACT

There are described apparatus and methods for producing time-varying of trellis-coded modulations, specifically, time-varying trellis-coded phase-shift-keying, to facilitate carrier phase recovery when the signal has been exposed to extraneous phase variations and noise.

Typically, eight-phase-shift-keying (8-PSK), with rate 2/3 convolutional coding, is followed on a repetitive basis by one or two formats of four-phase-shift-keying (4-PSK), which formats are chosen to ease phase synchronization and to conserve the use of bandwidth and not to worsen the bit error probability while reducing the probability of synchronization loss and the length of error bursts or "random walks".

The variation of the modulation formats could be:
(1) 8-PSK (rate 2/3) followed by 4-PSK,
(2) 8-PSK (rate 2/3) followed by 4-PSK (preferred format) and then 4-PSK (secondary format) or,
(3) any of many other periodic formats of 8-PSK and 4-PSK sections.

The use of this improved type of modulation is contemplated, for example, mobile radio links, particularly to counteract fading, or for optical fiber links to counteract other causes of signal degradation.

9 Claims, 4 Drawing Sheets

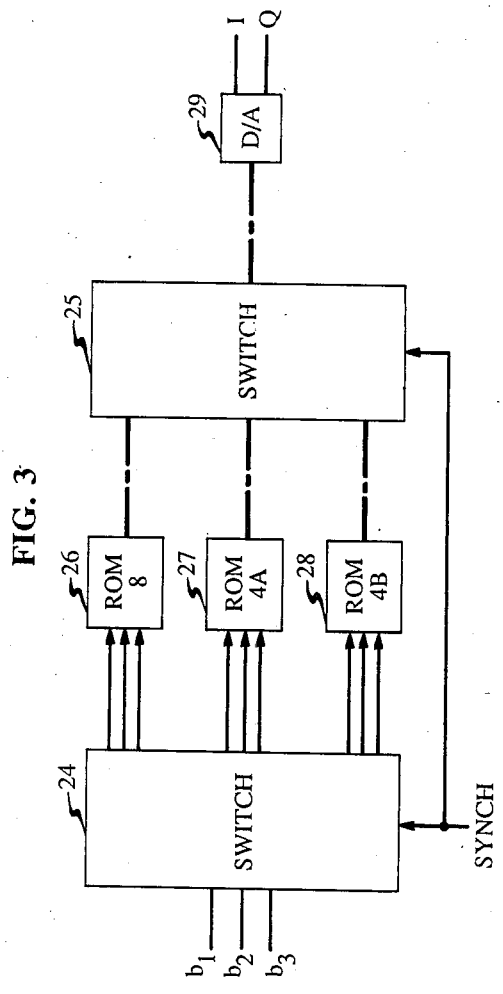
FIG. 3
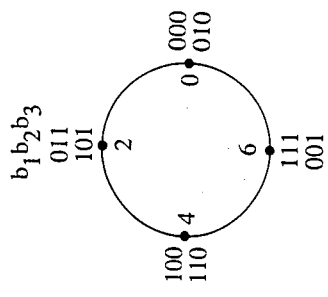
FIG. 6
MAPPING 4B
FIG. 5
MAPPING 4A
FIG. 4
MAPPING 8

TIME-VARYING TRELLIS-CODED MODULATION FORMATS WHICH ARE ROBUST IN CHANNELS WITH PHASE VARIATIONS

FIELD OF THE INVENTION

This invention relates to digitally-coded transmission techniques and equipment providing resistance to degradation of the signal quality during transmission, and particularly to techniques and equipment for non-binary digitally-coded modulation schemes such as trellis-coded phase-shift-keying having a need for resistance to carrier phase variations during transmission, such as occur in voice band modems, some types of radio transmission and also some types of optical fiber transmission.

BACKGROUND OF THE INVENTION

There are two types of digital coding generally used in communication systems for transmission through a communication medium to a receiver if the information signal is originally digital source data, or has been converted to a digital signal. The first type is usually the initial coding of the signal done to place the signal in a desired or standard format, as, for example, may be appropriate for multiplexing. The second type of coding is usually called channel coding because it is the type of coding designed to resist degradation of the signal quality during transmission through the communication medium.

A common type of channel coding is known as block coding. Block coding will usually consist of a number of bits together with a number of additional bits so related to the others to facilitate error detection and/or correction. Another type of channel coding is convolutional coding in which the check bits are periodically inserted in a continuous data stream.

One of the major problems of the communications art today is to use fully and effectively the communication capacity of every channel, regardless of type, in which high demand may occur. The following examples, while not exhaustive, indicate the dimensions of the problem.

In mobile radio communications, in some geographical markets, demand has grown so rapidly that eve modern cellular techniques have had to be supplemented by other techniques.

Farther afield, in the just-beginning market for using optical fibers in local loops and in communication links not classified as major toll links, it is anticipated that occasional demand will force the use of techniques for more fully and effectively using the bandwidth available on the fiber.

Nevertheless, classical channel coding actually uses more bandwidth for the same net usable information because of the additional check bits inserted.

One set of solutions for the capacity problem involves employing nonbinary digital modulation and coding schemes, or more properly, nonbinary digital modulation combined with channel coding by means of appropriate mapping rules.

For example, quadrature amplitude modulation and phase-shift-keying both lend themselves readily to mapping rules which allow one to combine them with channel coding to give various efficiencies and, ultimately, to effectively utilize the available communication bandwidth of a channel, be it radio or optical fiber.

The class of nonbinary digital signals of primary interest to us is that which employs phase-shift-keying (hereinafter, PSK). The combined modulation and coding schemes are known as trellis coding.

For example, in 4-PSK, a signal can be represented digitally by four discrete phases of the carrier signals, transmitting two bits of information. This scheme has twice the information rate of a 2-PSK signal occupying the same bandwidth. Theoretically, still higher rates of information transfer can be achieved by 8-PSK, or 16-PSK (generalizable as M-ary PSK where M=2, 4, 8, 16, etc). For example, three binary bits would be required to represent the same information as each phase of the 8-PSK signal.

Nevertheless, if one looks at the actual relative phases of the signals generated in PSK, which is most easily done by representing them on a polar-plot of the relative phases, one sees that the 4-PSK system has 90° minimum phase difference between states; and the 8-PSK system has only 45° minimum phase difference between states, and so forth. It is thus desirable to take additional steps to preserve the information in the signal against the random phase variations and random additive noise that can occur in the channel during transmission. Somewhat similarly, carrier phase offset variations that occur in the receiver that degrade a signal are also a common problem in some modems.

One of the common techniques used heretofore to overcome the problem of the effect of random additive noise is a method which can be generally characterized as convolutional coding. In such codes the input information bits are passed through a linear network with finite memory in such a way that corresponding to $k_1$ input information bits, $n_1$ output channel bits are generated. The code can be described by a finite state "trellis" where the code memory defines the number of states. The "trellis" description is appropriate because it suggests the incremental nature of the allowed changes between sequential states produced by the use of the coding memory.

This type of convolutional coding is combined with phase-shift-keying, or other non-binary types of modulation, such as quadrature amplitude modulation, in a modulation format chosen both to conserve the use of bandwidth in the channel and to overcome the effects of additive noise. Commonly, this combination of coding and modulation is called trellis coded modulation.

In the past, straight forward coding of 8-PSK proved to have few advantages with respect to 4-PSK in commercial practice. A trellis coded 8-PSK system was developed by G. Ungerboeck as described in his article "Channel Coding with Multilevel/Phase Signals", *IEEE Transactions on Information Theory*, Vol.IT28, No. 1, pp. 55–67, January 1982. This so-called Ungerboeck coding employed a wiser combination of the convolutional coding output bits and the discrete phase values in the modulation format, in order to gain a portion of the theoretically possible advantages. A combination of 8-PSK with a rate ⅔ convolutional code (i.e., rate=$k_1/n_1$=⅔, in terms of the above description) was done in such a way that a code-related property of alternative signals known as the "minimum Euclidean distance" was improved. Keeping this minimum Euclidean distance as large as feasible tended to protect the signal against degradation during transmission. This advantage is now obtained with coded 8-PSK, as compared to uncoded 4-PSK, (which has a smaller minimum Euclidean distance) without expanding the bandwidth employed.

Various modifications and improvements over Ungerboeck coding (e.g., trellis-coded multilevel/phase-shift-keying types of modulation) have been made over the last few years. For example see the articles (1) L.-F. Wei, "Rotationally Invariant Convolutional Channel Coding with Expanded Signal Space -- Part I: 180°," *IEEE Journal on Selected Areas in Communications*, Vol. SAC-2, No. 5, pp. 659–671, September 1984; (2) M. Oerder, "Rotationally Invariant Trellis Codes for MPSK Modulation," *ICC'85*, Chicago, IL, June 1985, pp. 18.1.1–18.1.5; (3) G. Ungerboeck, J. Hagenauer, T. Abdel-Nabi, "Coded 8-PSK Experimental Modem for the INTELSAT SCPC-System," Proceedings ICDSC, 7th International Conference on Digital Satellite Communications, Muenchen, May 1986, pp. 299–304; (4) M. Bertelsmeier, "Modified Coded Octal Phase-Shift-Keying with Improved Carrier-Phase Tracking Ability," *IEEE Global Telecommunications Conference*, GLOBECOM '86, Houston, TX, December 1986, Conference Record, pp. 38.4.1–38.4.5; and (5) G. Ungerboeck, "Trellis Coded Modulation with Redundant Signal Sets, Part I and Part II, *IEEE Communications Magazine*, Vol. 25, No. 2, pp. 5–21, February 1987.

Nevertheless, problems still exist with respect to phase sensitivity and to the limited pull-in range (about 22°) of trellis-coded 8-PSK systems which are representative of current multilevel/phase-shift-keying systems. Carrier phase variations at least this large are readily encountered in mobile radio communications, e.g., because of geographical or topographical factors and in other systems having fading channels or unstable oscillators or imperfect carrier recovery or combined effects of the above. The latter three types of problems can occur in modems, and both in mobile radio transmission and in the shorter optical fiber communication links, including local loops, where it is not economically feasible to prevent such problems at their inception. If the phase error is outside the pull-in range or interval, the carrier recovery fails, causing a random-walk situation with a long error burst.

Accordingly, it is one objective of this invention to solve this problem, that is, to provide improved protection against degradation for such a signal.

SUMMARY OF THE INVENTION

According to our invention, we solve the above-described problem by varying the number of modulation values with the passage of time to reduce degradation of the signal as reproduced at the receiver. A specific embodiment of our invention is a method where, for example, trellis-coded 8-PSK (rate ⅔ coding) and 4-PSK signals are alternating in time. At an intermediate level of generality, M-ary phase-shift-keying (rate $(N-1)/n$, where $M=2^n$) coding and N-ary, where $N=2^{(n-1)}$, phase-shift-keying alternate in time to strengthen carrier recovery and reduce the length of error bursts in a "random walk" situation of the recovery loop. Note that the number of bits from the coding processes do not change. The trellis coding process is thereby performed in the same manner for all time. However, the correspondence of the coding, hereinafter called mapping, to, e.g., 4-phases and 8-phases of modulation is changed periodically in a compatible manner to preserve the distance properties of the coded phase sequences. The result of the time-varying mapping rules we will hereinafter call the modulation format.

It is not necessary for the mapping rules to require the two coding rates to vary on a one-to-one basis. The mapping rule, could, for example, for a single period thereof, be 8-PSK (rate ⅔), 4-PSK; or 8-PSK (rate ⅔), 4-PSK, 4-PSK; or 8-PSK (rate ⅔), 8-PSK (rate ⅔), 4-PSK; or 8-PSK (rate ⅔), 8-PSK (rate ⅔), 8-PSK (rate ⅔), 4-PSK, etc., i.e., any periodic pattern of 8-PSK and 4-PSK sections. However, the mapping rule has to be changed in very specific manners to avoid distance losses. I.e., a modulation format of 8-4A-4B means that 8-PSK with a particular mapping is followed by 4-PSK with mapping A and 4-PSK with mapping B.

The required bandwidth of the coded 8-PSK system/4-PSK system using a rate ⅔ convolutional code is identical to that of the uncoded 4-PSK system and to that of the coded 8-PSK (rate ⅔) (conventional Ungerboeck coding) convolutional code. Thus, in general, our method requires no more bandwidth than the best prior Ungerboeck codes to transmit the same information.

Surprisingly, there are mapping rules and convolutional codes such that our hybrid time-varying schemes have the same probability of bit error at high channel signal-to-noise ratios as the best prior "Ungerboeck" codes, but at the same time many fewer "random walks," and fewer and shorter error bursts. Thus, pull-in range and carrier recovery performance are improved and the minimum Euclidean distance is not reduced.

BRIEF DESCRIPTION OF THE DRAWING

FIG. 3 shows a typical organization of the time-varying mapper of the transmitter of FIG. 1;

FIG. 4 shows the preferred polar-plot modulation diagram and mapping rules for an 8-phase PSK signal;

FIGS. 5 and 6 show the preferred polar-plot modulation diagrams and mapping rules of the 4-PSK signals which would follow the 8-PSK signal in various combinations in some optional versions of our invention;

DETAILED DESCRIPTION

Our invention uses a time-varying coding concept which will work as well for data generated initially by a computer as for an analog information signal followed by analog-to-digital conversion. We shall not concern ourselves with the initial transformation of the information into a bit stream. We shall assume that the data is transmitted in blocks (packets) with a unique word in the packet header. Carrier phase, bit timing, etc., is acquired by means of the packet header and then maintained throughout the block.

As we have stated before, trellis-coded 8-PSK modulation (actually, combined convolutional codes and phase modulation) is sensitive to carrier phase variations encountered in mobile radio communications, or in optical fiber networks, because of, e.g., fading the communication medium, or unstable oscillators, or otherwise imperfect carrier recovery.

To overcome the impairment of such a system when the phase error is outside the limited pull-in range, or whenever carrier recovery fails, according to a preferred specific embodiment of our invention we use a hybrid time-varying mapping of the coding to the multiple discrete modulation values, specifically, trellis-coded 8-PSK with rate ⅔ coding and 4-PSK in a time-varying manner. In its simplest form these different trellis-coded signals simply alternate in time; but more complicated patterns are not only feasible but attractive.

As compared to the conventional coded 8-PSK transmission system, our system can avoid the above-described problems most of the time. That is, it reduces the probability of synchronization loss and consequently, the occurrence of a burst and, on average, therefore reduces its length (to the end of a framing period). The complexity of the maximum-likelihood receiver (sometimes known as a Viterbi decoder) is not increased. Our system does simply somewhat more detailed frame synchronization, which is easily done as hereinafter described.

Figure 1:
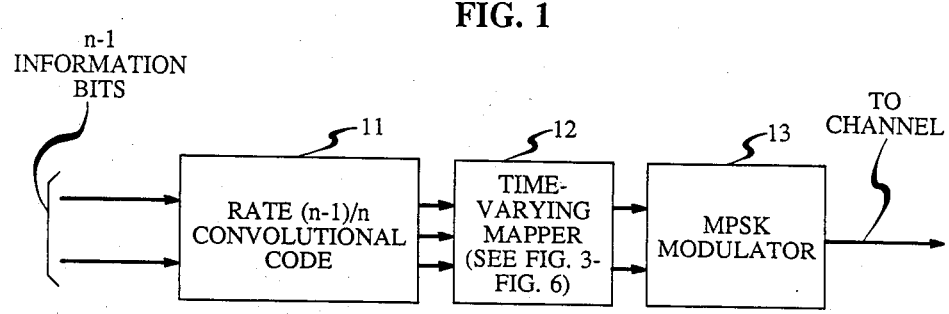
FIG. 1 shows an illustrative block diagram of a transmitter according to our invention, using time-varying mapping for trellis-coded M-PSK.

In FIG. 1, we assume that the input bit stream is characterized by $M=(n-1)$ information bits per word. These bits are then converted to n bits per word in a (rate=$(n-1)/n$) convolutional encoder 11. This encoder 11 has a number of memory states which number we shall call v. We note that the number of memory states is not necessarily dictated by the value of n. Coder 11 sends its output to the time-varying mapper 12 which maps the output code bits into the PSK signals as described hereinafter in connection with FIGS. 3 through 6. It is noted that encoder 11 and mapper 12 may in their 8-PSK mode of operation be essentially identical to those disclosed in the basic patent on convolutional or trellis-coded modulation, U.S. Pat. No. 4,077,021 issued Feb. 28, 1978 to Casjka and Ungerboeck. The disclosure therein of the mapper is incorporated herein by reference. Our mapper 12 adds to the mapper as therein disclosed means for switching some of the modulator drive signals to other of the modulator drive signals, on a time-varying basis, at the input to the phase-shift-keying modulator 13. The details of the substitutional mapping in mapper 12 are shown hereinafter in FIGS. 3, 5 and 6.

Modulator 13 may be of any of the types well known in the art for phase-shift-keying, but is preferably as described in connection with FIG. 7, where the In-phase and Quadrature components are combined to yield the appropriate modulated digital phase value.

In general, in the operation of the generalized embodiment of FIG. 1, our use of a time-varying mapping rule in mapper 12 will yield an unequal probability distribution of the various possible non-binary signal values; whereas in conventional trellis-coded M-PSK typically all $2^n$ signal values are equally likely when random input data is used. That occurs because the conventional trellis-coded M-PSK uses a mapping rule which is time invariant.

Figure 2:
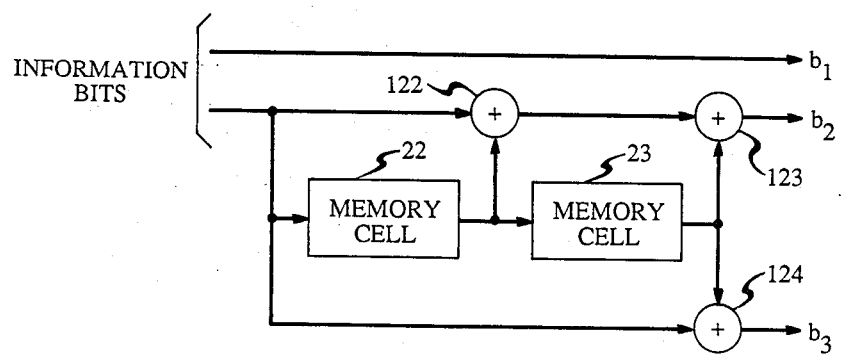
FIG. 2 shows a two-thirds rate coder of the type usable in the transmitter of FIG. 1.

Various parameters of a specific system of 8-PSK with rate ⅔ coding are shown in FIGS. 2-6. FIG. 2 shows a schematic representation of the coder itself which illustratively uses two bits of memory to convolve the signal. Let us assume, that out of the input bit stream we partition every two bits (this effect will be exactly undone in the receiver). The first of these two bits is directed into the memory branch of the coder and causes the resident bit in memory cell 22 to both move into memory cell 23 and also in parallel to be added to the input bit in adder 122 as shown in the upper portion of the memory branch. The previously resident bit in memory cell 23 moves to the output where it is added in adder 123 both to the previous sum to generate bit $b_2$ and to that first input information bit in adder 124 to generate output $b_3$. The other of the two input bits is passed straight through the upper branch of the code converter 21 to become output bit $b_1$. In other words, for every two input bits converter 21 generates three output bits, so that its coding rate is ⅔. In FIG. 3 we see how various combinations of the output bits are used to derive the signals that are in turn used to drive the phase modulator 13 to give the pattern of modulation signals illustrated in FIGS. 4, 5 and 6, i.e., from ROMS 26, 27 and 28, respectively. The mapping rule for this arrangement is chosen for the desired minimum Euclidean distance, as taught in the prior art.

Unlike the teaching of the prior art, at some later point in time the diagonally positioned phase modulation signal values of the polar-plot shown in FIG. 4 are replaced by the time-varying mapping of FIG. 3 so that the modulator will generate only the four phases of modulation shown in FIG. 5. E.g., when the number one signal value would have been transmitted by the prior art, signal value number 2 is transmitted; when signal value number 7 would have been transmitted, signal value number 0 is transmitted. When signal value number 5 would have been transmitted, signal value number 6 is transmitted; when signal value number 3 would have been transmitted signal value number 4 is transmitted. An analogous, but different mapping rule, is shown in FIG. 6, to be used alternately with the mapping rule of FIG. 5, although it allows only the same four phase modulation signals as in FIG. 5.

In FIG. 3 the three bits from the code converter 21 of FIG. 2, by the synchronized action of switches 24 and 25 access one of the three mapping rules stored in ready-only-memories (ROMS) 26, 27 and 28, which effectuate the translations from bit combinations to modulation signal values specifically illustrated in FIGS. 4, 5 and 6, respectively.

The resulting binary signals are converted to the desired analog values for the "I" and "Q" (Not the illustrative polar plot) orthogonal component signals for driving the modulator 13, by conversion in the digital-to-analog converter 29.

The details of the ROMS 26-28 are well within the skill of the worker in the art and, in fact, may comprise separate regions of one larger memory.

We can, therefore, utilize various combination periodic mapping rules such as coded 8-PSK, 4-PSK, 4-PSK (where the latter two actually differ) or coded 8-PSK, 4-PSK repeating at equal frequencies. This will generate a net overall result somewhere between 8-PSK and 4-PSK depending on the mapping rule used. More generally, if we used coded $2^n$-PSK (rate $_n{}^{(n-1)}$) and $2^{n-1}$-PSK we will obtain a result in which the modulation behaves as if it were somewhere in between the two types of phase modulation.

For the case of 8/4-PSK (with any number of 8-PSK sections followed by one 4-PSK) the mapper 4A is used for the 4-PSK section; and for the 8/4/4-PSK scheme, the 8/4A/4B mappers are used in that order. For a larger number of 4-PSK sections, the 4A/4B mappers are used alternatively, i.e., 8/4A/4B/4A; 8/4A/4B-/4A/4B, etc.

Figure 7:
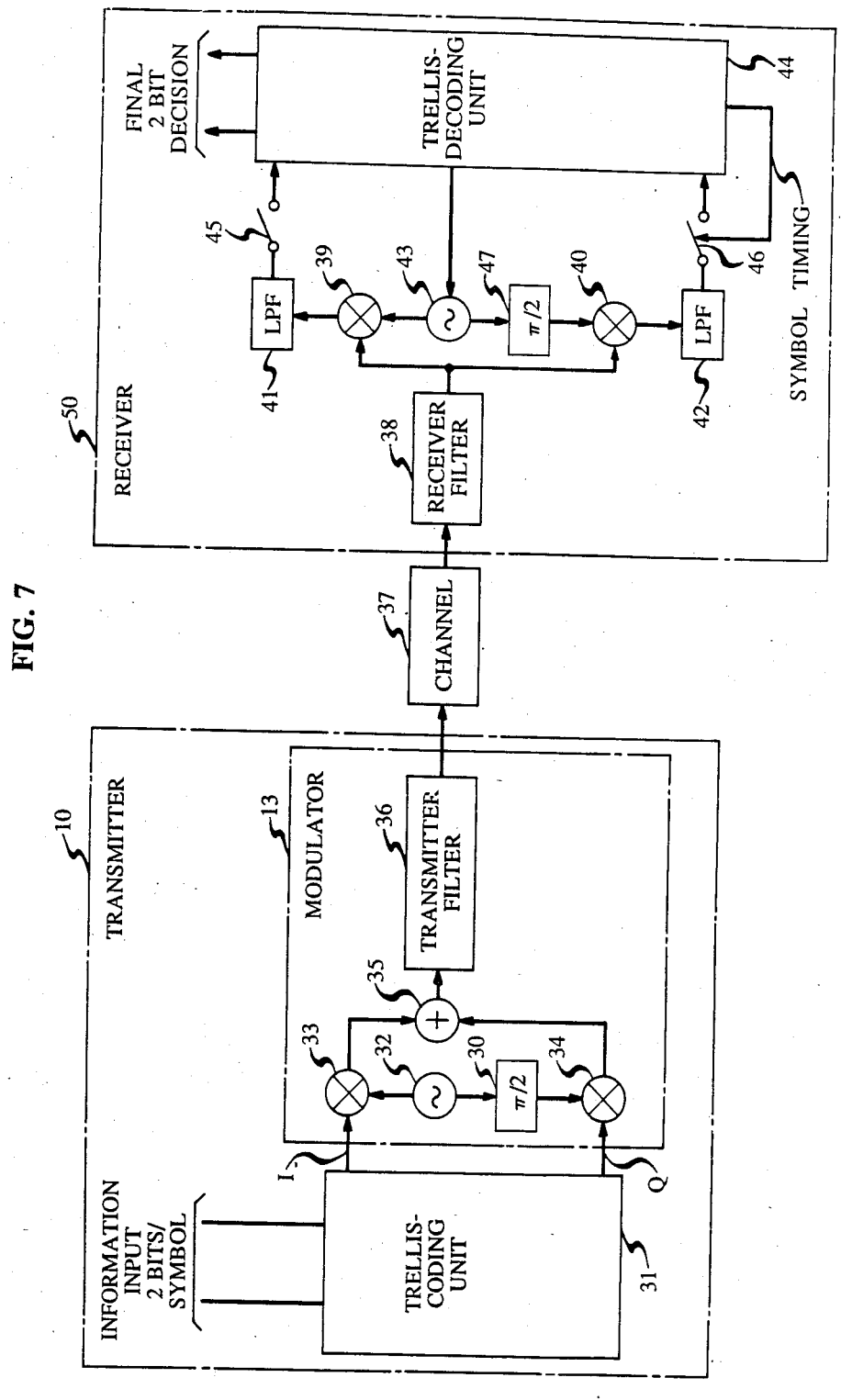
FIG. 7 shows an overall block of a transmission system employing our invention, wherein the transmitter is of type shown in FIG. 1.

FIG. 7 shows a block diagram of the complete system in which the transmitter 10 and receiver 50 are separated by a communication channel 37 such as a mobile radio link or an optical fiber. The transmitter 10 includes the trellis-coded modulation unit 31, which in turn includes encoder 11 in FIG. 1 and the time-varying mapper 12, which is shown in FIG. 1 for the general case or in FIG. 3 more specifically. Transmitter 10 further includes the modulator 13 which illustratively comprises multiplies 33 and 34 which respond 90° out of phase with respect to each other to the signals from oscillator 32 to generate the orthogonal coordinate portions of the modulation values. The resulting signals are coupled by the adder 35 to transmission filter 36, which then passes them to communication channel 37.

In the receiver 50 the receiving filter 38 has its output split between multipliers 39 and 40 which respond to oscillator 43 in like manner to corresponding oscillators of transmitter 10. The outputs of multipliers 39 and 40 are respectively passed through low-pass filters 41 and 42, through the timing and sampling elements 45 and 46 to the trellis decoder/demodulator 44 which will be shown in more detail hereafter in FIG. 8.

Figure 8:
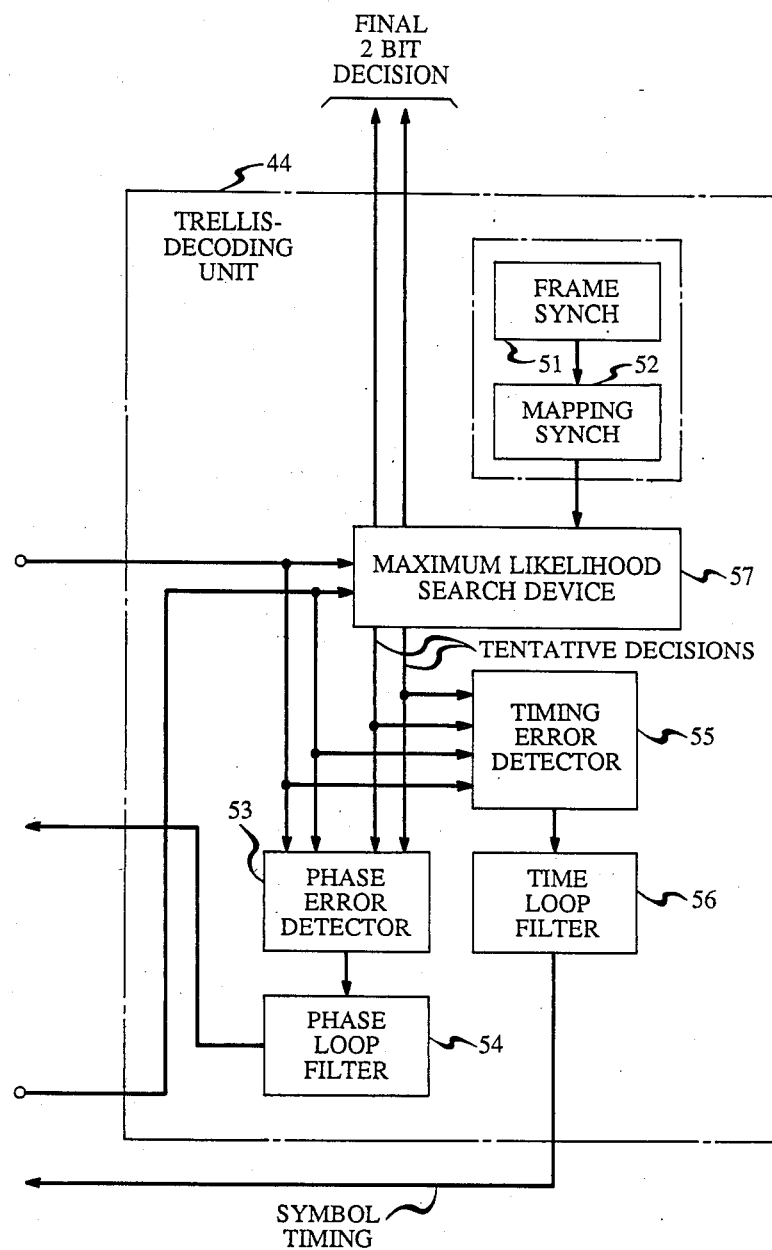
FIG. 8 shows an illustrative block diagram of a receiver which would be used with the transmitter of FIG. 1 to implement a system as shown in FIG. 7.

In FIG. 8 the trellis decoder is based on the so-called Viterbi maximum likelihood decision-making technique with a suitable delay before the output symbols decoded/demodulated symbols are released. However, the phase-locked loop needs more up-to-date information for tracking the carrier phase in a stable manner. Tentative decisions about the transmitted signal points are used by the phase detector. These correspond to one symbol interval delayed decisions corresponding to the best metric for the finally released information bits. Simple hard decisions can also be used but with less success. The phase detector produces a correction signal for the voltage controlled local oscillator 43 in FIG. 7. Throughout this discussion we assume that symbol timing and frame timing are acquired and tracked perfectly. The subsystems for symbol timing are indicated in FIG. 8.

The maximum likelihood search device 57 of FIG. 8 and its frame synchronization may be identical to that disclosed in FIGS. 7 and 8 of U.S. Pat. No. 4,447,908 to P. R. Chevillat et al., or in the comprehensive article by Forney, "The Viterbi Algorithm," *Proceedings of the IEEE*, Vol. 61, No. 3, March 1973, incorporated herein by reference, except that the prior art frame synchronizer, e.g., synchronizer 51, is now supplemented by mapping synchronizer 52, which is synchronized by synchronizer 51, but must now provide further signals within a frame to determine the applicable mapping rule to be used in search device 57. This demapping simply reverses or undoes that of FIG. 3.

In the operation of the embodiment of FIG. 7, trellis-coder 31 operates essentially like the rate $\frac{2}{3}$ convolutional encoder of FIG. 2 and the time-varying mapper of FIG. 3, although several other choices could be made in the encoder regarding, e.g., the grouping of input bits and the degree of convolution, placing the resulting modulation component signals on the input leads of modulator 13.

The carrier wave generated by oscillator 32 in modulator 13 is modulated by multiplying it by the component signals in modulators 33 and 34.

Multipliers 33 and 34 are driven in quadrature by the sine (90° phase difference) and cosine waves from oscillator 32. Thus, the appropriately mapped modulation values called for by trellis coder 31 are passed to the output of the transmitter 10 at summing junction 35. These include both the normal values of FIG. 4 and the modulation values produced by the doubled-up mapping of FIGS. 5 or 6 or both.

Since phase of a modulated carrier wave should change smoothly without undesired effects, it is conventional to use a filter 36 at the output of transmitter 10. In other words, transmission filter 36 finishes conditioning the signal of transmitter 10 as appropriate for channel 37.

In the receiver 50, receiver filter 38 removes some of the noise accumulated with the signal in channel 37, except that, of course, which has affected the apparent phases of the modulation values.

Oscillator 43 and multipliers 39 and 40 then resolve the modulation values into appropriate signal components and separately send them to low-pass filters 41 and 42, respectively, and thereafter through timing switches 45 and 46 to the trellis-decoder 44, which basically performs the maximum likelihood sequence detection function and then undoes the processes performed by trellis-coder 31 in transmitter 10.

The operation of trellis decoder 44 has been described above in connection with FIG. 4.

It should be clear that the above-described principles of time-varying mapping of code values to modulation values can be employed in many different nonbinary modulation systems and that many of the details described above can be changed without departure from the broadcast aspects of those principles.

For example, the same sort of time-varying mapping can be advantageously performed in a quadrature amplitude modulation system. The primary change in the analysis is the type of channel noise which causes carrier recovery and/or signal discrimination problems. But, once again, long error bursts will be avoided.

What is claimed is:

1. A method for the digitally-coded transmission of information, said method being of the type including the steps of providing a carrier wave in the transmitter, coding the information according to a type of convolutional digital coding, and modulating the carrier wave with the convolutionally-coded information according to a nonbinary digital modulation scheme involving a mapping of convolutionally-coded information values to nonbinary modulation values, said method being characterized by the step of varying periodically the number of modulation values in the nonbinary digital modulation scheme to change correspondingly the mapping scheme to change correspondingly the mapping from the convolutionally coded information to the of phase noise or phase-offset upon the transmission.

2. A method according to claim 1, said method being further characterized in that the modulating step includes employing $2^n$ phase-shift-keying in which the $2^n$ modulation values have equal minimum phase separations combined with a rate $_n{}^{n-1}$ convolutional code, where n is a positive integer greater than unity, and the step of varying periodically the number of modulation values comprises periodically reducing the number of modulation values to $2^{n-1}$ and periodically restoring the number of modulation values to $2^n$.

3. A method according to claim 2,
said method being further characterized in that
the varying step comprises reducing the number of modulation values to $2^{(n-1)}$, the number of modulation values being later restored to $2^n$ after multiple occurrences of the reduced number, said variation being repeated periodically.

4. A method according to claim 3,
said method being characterized in that
the controlling of the multiple occurrences of the reduced number of modulation values includes selecting different mapping rules for successive ones of the multiple occurrences, according to both of the following two rules: first, to have relative phase angles of alternate modulation values starting with the second one from the zero phase reference changed in phase by $+\phi$ to correspond to the phase angle of the next following value, in terms of increasing phase angle and, second, to have the relative phase angles of alternate modulation values changed in phase by $-\phi$ to correspond to the phase angle of the next preceding value, in terms of increasing phase angle, in that order.

5. A method according to claim 2,
said method being characterized in that
the modulating step includes employing 8-PSK with $\frac{2}{3}$ rate convolution coding, and
the varying step comprises periodically reducing the number of modulation values to 4, and restoring the number of modulation values to the original number periodically.

6. Apparatus for the digitally-coded transmission of information, including a transmitter comprising
means for generating a carrier wave,
means for preparing an information signal for combined convolutional coding and modulation of the carrier wave,
means for so modulating the carrier wave including
logic apparatus for providing the convolutional coding, and
means for mapping the convolutional code to a set of multiple discrete modulation values,
said apparatus being characterized in the transmitter by
a time-varying mapping means for generating a selected number of modulation values in response to the convolutional coding, and for reducing the number of modulation values to strengthen carrier recovery in the receiver, and for thereafter restoring the selected number of modulation values.

7. Apparatus as claimed in claim 6,
said apparatus being characterized in that
the time-varying mapping means comprises
first means for mapping from three signal bits derived from a rate $\frac{2}{3}$ convolutional code to an 8-PSK signal during first separated signal periods, and
second means for mapping from the three signal bits to one or more 4-PSK signals during second signal periods between the separated first signal periods.

8. Apparatus for transmitting phase-shift-keyed signals, comprising
means for generating a carrier wave,
means for converting every two input information bits to 3 coded bits derived from a rate $\frac{2}{3}$ convolutional code, and
means for modulating the carrier wave as a phase-shift-keyed signal in response to said coded bits,
said apparatus being characterized by
first means between the converting means and the modulating means for mapping from three coded bits to an 8-PSK signal in which the modulation values have eight different relative phases which are equally spaced, said first mapping means controlling the modulating means during first signal periods,
second means between the converting means and the modulating means for mapping from the three signal bits to a 4-PSK signal in which alternate modulation values starting with the second one from the zero phase reference are changed in phase by $+45°$ to have the phase angle of the next following modulation values, in terms of increasing phase angle, said second mapping means controlling the modulating means during second signal periods immediately following the first signal periods.

9. Apparatus as claimed in claim 8,
said apparatus being characterized by
third means between the converting means and the modulating means for mapping from the three signal bits to a 4-PSK signal in which alternate modulation values starting with the second one from the zero phase reference are changed in phase by $-45°$ to have the phase angle of the next preceding modulation, in terms of increasing phase angle, said third mapping means controlling the modulating means during third signal periods immediately following the second signal periods.

* * * * *

UNITED STATES PATENT AND TRADEMARK OFFICE
CERTIFICATE OF CORRECTION

PATENT NO. : 4,807,253
DATED : February 21, 1989
INVENTOR(S) : Joachim Hagenauer and Carl-Erik Sundberg It is certified that error appears in the above—identified patent and that said Letters Patent is hereby corrected as shown below:

Column 1, line 46, "eve" should read --even--; line 57, "because" should read --transmitted because--; line 63, "quardrature" should read --quadrature--. Column 3, line 57, "(N-1)/n" should read --(n-1)/n--. Column 4, line 68, "fading the" should read --fading in the--. Column 5, line 22, "simply" should read --imply--; line 43, "other" should read --others--. Column 6, line 47, "Not" should read --note--; line 60, "$n^{(n-1)}$" should read -- $\frac{(n-1)}{n}$ --. Column 8, line 55, "scheme to change correspondingly the mapping" should be deleted; line 56, after "information to the" --nonbinary modulation values to reduce the effect-- should be inserted; line 64, "$n^{n-1}$" should read -- $\frac{n-1}{n}$ --.

Signed and Sealed this

Third Day of October, 1989

*Attest:*

DONALD J. QUIGG

*Attesting Officer*   *Commissioner of Patents and Trademarks*